(12) United States Patent
Doreau et al.

(10) Patent No.: US 8,753,727 B2
(45) Date of Patent: Jun. 17, 2014

(54) POLYESTER-CARBAMATE POLYMER AND COATING COMPOSITIONS THEREOF

(75) Inventors: Nicolas Doreau, Passy (FR); Benoit Prouvost, L'Abergement de Cuisery (FR); Paul Stenson, Gattikon (CH)

(73) Assignee: Valspar Sourcing, Inc., Minneapolis, MN (US)

( * ) Notice: Subject to any disclaimer, the term of this patent is extended or adjusted under 35 U.S.C. 154(b) by 445 days.

(21) Appl. No.: 13/114,455

(22) Filed: May 24, 2011

(65) Prior Publication Data

US 2012/0125800 A1 May 24, 2012

Related U.S. Application Data

(63) Continuation-in-part of application No. PCT/US2009/065467, filed on Nov. 23, 2009.

(60) Provisional application No. 61/118,237, filed on Nov. 26, 2008.

(51) Int. Cl.
*B29D 22/00* (2006.01)
*B29D 23/00* (2006.01)
*B32B 1/08* (2006.01)

(52) U.S. Cl.
USPC .......... 428/35.7; 206/524.3; 523/100

(58) Field of Classification Search
USPC .......... 206/524.3; 523/100; 428/35.7
See application file for complete search history.

(56) References Cited

U.S. PATENT DOCUMENTS

| | | | |
|---|---|---|---|
| 3,166,434 A | 1/1965 | Gauger, Jr. | |
| 3,306,868 A | 2/1967 | Adrian, Jr. | |
| 3,333,022 A | 7/1967 | Reiners et al. | |
| 3,340,327 A | 9/1967 | Spellberg et al. | |
| 3,448,066 A | 6/1969 | Parker | |
| 3,477,966 A | 11/1969 | Formaini | |
| 3,674,727 A | 7/1972 | Fekete et al. | |
| 3,867,480 A | 2/1975 | Fujiyoshi et al. | |
| 3,919,063 A | 11/1975 | Maruyama et al. | |
| 3,933,757 A | 1/1976 | Pratt et al. | |
| 3,965,059 A | 6/1976 | Kerridge et al. | |
| 3,986,992 A | 10/1976 | Canning et al. | |
| 3,988,288 A | 10/1976 | Yamauchi et al. | |
| 4,010,130 A | 3/1977 | Matsuo et al. | |
| 4,073,827 A | 2/1978 | Okasaka et al. | |
| 4,167,542 A | 9/1979 | Nelson | |
| 4,206,291 A | 6/1980 | Takahashi et al. | |
| 4,340,519 A | 7/1982 | Kotera et al. | |
| 4,360,647 A | 11/1982 | Hefner, Jr. | |
| 4,443,580 A | 4/1984 | Hefner, Jr. | |
| 4,452,954 A | 6/1984 | Schade et al. | |
| 4,522,977 A | 6/1985 | Gardner | |
| 4,631,320 A | 12/1986 | Parekh et al. | |
| 4,777,196 A | 10/1988 | Hefner, Jr. | |
| 5,198,471 A | 3/1993 | Nauman et al. | |
| 5,242,994 A | 9/1993 | Nield et al. | |
| 5,252,682 A | 10/1993 | Bayha | |
| 5,278,282 A | 1/1994 | Nauman et al. | |
| 5,288,805 A | 2/1994 | Kodali | |
| 5,290,828 A | 3/1994 | Craun et al. | |
| 5,314,751 A | 5/1994 | Nield et al. | |
| 5,693,715 A | 12/1997 | Kodali | |
| 5,739,215 A | 4/1998 | Westerhof et al. | |
| 5,916,979 A | 6/1999 | Koegler et al. | |
| 6,048,949 A | 4/2000 | Muthiah et al. | |
| 6,069,187 A | 5/2000 | Kusumoto et al. | |
| 6,306,934 B1 | 10/2001 | Bode et al. | |
| 6,413,648 B1 | 7/2002 | Heyenk et al. | |
| 6,472,480 B1 | 10/2002 | Anderson | |
| 6,512,025 B2 | 1/2003 | Choudhery | |
| 6,710,151 B2 | 3/2004 | Kuwatsuka et al. | |
| 6,893,678 B2 | 5/2005 | Hirose et al. | |
| 6,930,161 B2 | 8/2005 | Schwarte et al. | |
| 6,974,631 B2 | 12/2005 | Hayes et al. | |
| 7,198,849 B2 | 4/2007 | Stapperfenne et al. | |
| 7,326,752 B2 | 2/2008 | McAlvin et al. | |
| 7,517,559 B2 | 4/2009 | Thiebes et al. | |
| 7,763,323 B2 | 7/2010 | Mayr et al. | |
| 2003/0064185 A1 | 4/2003 | Mazza et al. | |
| 2004/0044117 A1 | 3/2004 | Kiefer-Liptak et al. | |
| 2004/0171746 A1 | 9/2004 | Parekh et al. | |
| 2004/0198941 A1 | 10/2004 | Schwarte et al. | |
| 2005/0014012 A1 | 1/2005 | Stapperfenne et al. | |
| 2005/0038162 A1 | 2/2005 | Kuhlmann et al. | |
| 2005/0129847 A1 | 6/2005 | Thiebes et al. | |
| 2005/0196629 A1 | 9/2005 | Bariatinsky et al. | |
| 2006/0093768 A1 | 5/2006 | Parekh et al. | |

(Continued)

FOREIGN PATENT DOCUMENTS

| EP | 0135924 A2 | 4/1985 |
|---|---|---|
| EP | 0548727 A2 | 12/1992 |

(Continued)

OTHER PUBLICATIONS

International Search Report and Written Opinion for corresponding International Application No. PCT/US2009/065467 mailed on Feb. 11, 2010 (15 pages).

International Search Report and Written Opinion for International Application No. PCT/US2009/065848 mailed on May 7, 2010 (12 pages).

English-Language Machine Translation of WO94/07932.

*Primary Examiner* — Michael C Miggins

(57) ABSTRACT

A polyester-carbamate polymer and coating compositions containing the polymer are provided. The polyester-carbamate polymer preferably includes a polyester-carbamate backbone and one or more blocked isocyanate groups. A coating composition is provided that preferably includes the polyester-carbamate polymer and a thermoplastic dispersion. In a preferred embodiment, the coating composition is an organosol.

20 Claims, No Drawings

(56) References Cited

U.S. PATENT DOCUMENTS

| | | |
|---|---|---|
| 2006/0149019 A1 | 7/2006 | Wamprecht et al. |
| 2007/0054140 A1 | 3/2007 | Mayr et al. |
| 2007/0208117 A1 | 9/2007 | Matsuki et al. |
| 2007/0281179 A1 | 12/2007 | Ambrose et al. |
| 2008/0015302 A1 | 1/2008 | Kiefer-Liptak et al. |
| 2008/0026613 A1 | 1/2008 | De France |
| 2010/0056726 A1 | 3/2010 | Payot et al. |
| 2010/0260954 A1 | 10/2010 | Stenson et al. |
| 2011/0290696 A1 | 12/2011 | Stenson et al. |
| 2012/0027974 A1 | 2/2012 | Skillman et al. |
| 2012/0058354 A1 | 3/2012 | Hayes et al. |
| 2012/0125799 A1 | 5/2012 | Doreau et al. |

FOREIGN PATENT DOCUMENTS

| | | |
|---|---|---|
| EP | 0583777 A1 | 8/1993 |
| EP | 0780455 A2 | 12/1996 |
| EP | 1498461 | 5/2004 |
| EP | 1627898 A1 | 5/2004 |
| EP | 1474490 | 6/2005 |
| GB | 1280404 | 7/1972 |
| WO | 9407932 A1 | 4/1994 |
| WO | 9726304 A1 | 7/1997 |
| WO | 03029319 A1 | 4/2003 |
| WO | 2008036629 | 3/2008 |
| WO | 2009117330 A1 | 9/2009 |
| WO | 2010055019 | 5/2010 |
| WO | 2010062928 A1 | 6/2010 |

POLYESTER-CARBAMATE POLYMER AND COATING COMPOSITIONS THEREOF

CROSS-REFERENCE TO RELATED APPLICATION(S)

This application is a continuation-in-part application of International Application Serial No. PCT/US2009/065467 (now published as WO 2010/062844) filed on Nov. 23, 2009, which claims the benefit of U.S. Provisional Application No. 61/118,237 filed on Nov. 26, 2008, each of which is incorporated herein by reference in its entirety.

TECHNICAL FIELD

This invention relates to a polyester-carbamate polymer. The polyester-carbamate polymer may be included in a coating composition for use, for example, on a packaging article.

BACKGROUND

Conventional container coatings may be derived from a thermally curable formulation that includes particles of a thermoplastic material in an organic solvent. Vinyl chloride polymers such as poly(vinyl chloride) ("PVC") have frequently been employed as the thermoplastic material in such coatings. When these coatings are applied to a substrate and cured, the thermoplastic material can degrade and discolor. Degradation products such as, for example, hydrochloric acid ("HCl") can attack the substrate.

To stabilize thermoplastic materials such as PVC and reduce degradation, epoxy resins may be added to the coating formulation. These epoxy resins typically include polyglycidyl ethers of aromatic polyols such as bisphenol A (often referred to as "BADGE"). Epoxy novolacs and epoxidized linseed oil have also been used as stabilizers for coating formulations containing thermoplastic materials such as PVC.

There is a desire to reduce or eliminate epoxy compounds from certain types of food-contact coatings. However, it has been problematic to formulate thermoplastic coating formulations that exhibit very low or non-detectable levels of mobile forms of these compounds while still retaining the required coating characteristics (e.g., flexibility, adhesion, corrosion resistance, stability, etc.).

Thus, there is a continuing need for improved coating compositions.

SUMMARY

In one aspect, the present invention provides a polyester-carbamate ("PEC") polymer suitable for use in coating applications. The polymer preferably includes a backbone having one or more ester and carbamate linkages, and more preferably a plurality of both linkages. In some embodiments, the PEC polymer is a self-crosslinkable polymer that preferably includes at least one blocked isocyanate group, and more preferably at least one deblockable isocyanate group.

In another aspect, the present invention provides a coating composition that includes a PEC polymer described herein in combination with a thermoplastic dispersion. The thermoplastic dispersion may include polyvinyl chloride particles and a liquid carrier. In a preferred embodiment, the coating composition is an organosol coating composition. The coating composition is preferably suitable for forming a food-contact coating.

In yet another aspect, the present invention provides a method for forming a coating composition. The method may include, for example, providing a PEC polymer that includes both ester and carbamate linkages and preparing a coating composition that includes the PEC polymer and a thermoplastic dispersion.

In yet another aspect, the present invention provides a packaging article such as, for example, a food or beverage container or a portion thereof having a coating composition of the invention adhered on a least a portion of a surface thereof. The coating composition may be used as a mono-layer coating system or may constitute one or more layers of a multi-layer coating system.

In yet another aspect, the present invention provides a method of making a coated article, more preferably a method of making a packaging article (e.g., a food or beverage container) or a portion thereof. A coating composition of the present invention is applied to a substrate, typically a metal substrate, prior to or after forming the metal substrate into a packaging container or a portion thereof. The coating composition may be applied to an external surface of the packaging container, an internal surface of the packaging container (e.g., a food or beverage-contact surface, a drug-contact surface, etc.), or a combination thereof. In one embodiment, the coating composition of the invention is applied to at least a portion of a planar metal surface and then cured prior to forming the metal substrate into a packaging container or a portion thereof.

The above summary of the invention is not intended to describe each disclosed embodiment or every implementation of the invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

SELECTED DEFINITIONS

Unless otherwise specified, the following terms as used herein have the meanings provided below.

A group that may be the same or different is referred to as being "independently" something. Substitution is anticipated on the organic groups of the compounds of the invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "substantially free" of a particular mobile compound means that the compositions of the present invention contain less than 100 parts per million (ppm) of the recited mobile compound.

The term "essentially free" of a particular mobile compound means that the compositions of the invention contain less than 10 ppm of the recited mobile compound.

The term "essentially completely free" of a particular mobile compound means that the compositions of the invention contain less than 1 ppm of the recited mobile compound.

The term "completely free" of a particular mobile compound means that the compositions of the invention contain less than 20 parts per billion (ppb) of the recited mobile compound.

If the aforementioned phrases are used without the term "mobile" (e.g., "substantially free of XYZ compound") then the compositions of the invention contain less than the aforementioned amount of the compound whether the compound is mobile in the coating or bound to a constituent of the coating.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C.

The term "food-contact surface" refers to a surface of an article (e.g., a food or beverage container) that is in contact with, or suitable for contact with, a food or beverage product.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

The term "dispersion" in the context of a dispersible polymer refers to the mixture of a dispersible polymer and a carrier. The term "dispersion" is intended to include the term "solution."

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

The term "organosol" refers to a dispersion of thermoplastic particles in a liquid carrier that includes an organic solvent or a combination of an organic solvent and a plasticizer.

The term "plastisol" refers to a dispersion of thermoplastic particles in a plasticizer.

The term "easy open end" refers to a can end (typically an end of a food or beverage container) that includes (i) a frangible opening portion (which for some beverage can ends functions as a drinking spout) and (ii) a riveted portion for attaching a pull tab thereto for purposes of opening the frangible opening portion to access the product housed within a can or container.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention provides a polyester-carbamate polymer ("PEC polymer"), as well as a hardenable coating composition including the polymer. In preferred embodiments, the coating composition includes both the PEC polymer and a thermoplastic dispersion.

The PEC polymer of the invention can have any suitable structural configuration, including, for example, a backbone of any suitable configuration. The backbone can have different structural configurations depending on a variety of factors such as the materials used to form the backbone and the desired end use for the polymer. The backbone may include one or more ester linkages and/or one or more carbamate (or urethane) linkages. Preferably, the backbone is a polyester-carbamate backbone that includes a plurality of ester and carbamate linkages.

The backbone preferably includes at least one polyester oligomer or polymer segment and, more preferably, a plurality of such segments. The polyester segments are typically attached on at least one end to another portion of the backbone via a carbamate linkage. In some embodiments, one or more polyester segments are attached on each end via a carbamate linkage to other portions of the polymer backbone. The polyester segment may be attached on one or more ends via a carbamate linkage to a segment of the backbone provided by a polyisocyanate compound.

The polyester backbone segments may be formed in situ during production of the PEC polymer or may be provided by a preformed polyester oligomer or polymer. In preferred embodiments, a preformed hydroxyl-functional polyester oligomer or polymer is used to provide the polyester segment(s). If desired, the polyester segments may include polymer linkages, side chains, and end groups not related to simple polyol and polyacid components. In some embodiments, alkyd compounds or fatty acids may be useful for forming the polyester segments and/or the PEC polymer.

The PEC polymer preferably includes a plurality of pendant and/or terminal functional groups. Suitable functional groups include, for example, isocyanate groups, blocked isocyanate groups, isocyanate-reactive functional groups, hydroxyl groups, oxirane groups, unsaturated groups (i.e., groups containing one or more non-aromatic (e.g., aliphatic) carbon-carbon double bond), amino groups, carboxyl groups, and derivatives or combinations thereof.

The PEC polymer preferably includes at least one blocked isocyanate group, which may be either deblockable or non-deblockable. An example of a deblockable isocyanate group is a blocked isocyanate group where the blocking group, under suitable film-curing conditions, can either (i) disassociate to liberate a free (or unblocked) isocyanate group or (ii) be displaced or replaced by another group or component. An example of a non-deblockable isocyanate group is a blocked isocyanate group where the blocking group, under suitable curing conditions, does not disassociate to liberate a free isocyanate group or is not readily displaced or replaced by another group or component.

The backbone of the PEC polymer preferably includes at least one terminal hydroxyl group, and more preferably two terminal hydroxyl groups. The PEC polymer preferably has a hydroxyl number of at least about 5, more preferably at least about 10, and even more preferably at least about 15. Preferably, the PEC polymer has a hydroxyl number of less than about 200, more preferably less than about 150, and even more preferably less than about 100. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D 1957-86 (Reapproved 2001) entitled "Standard Test Method for Hydroxyl Value of Fatty Oils and Acids" and available from the American Society for Testing and Materials International of West Conshohocken, Pa.

The PEC polymer may be a self-crosslinking polymer that includes at least two complimentary reactive functional groups, preferably at least one of which is a deblockable isocyanate group. For example, in a presently preferred embodiment, the PEC polymer includes (i) at least one deblockable isocyanate group and (ii) at least one, and more preferably two, pendant and/or terminal isocyanate-reactive groups (preferably hydroxyl group, more preferably terminal hydroxyl groups).

The deblockable isocyanate groups, when present, are preferably capable of de-blocking under suitable film-curing conditions so that the PEC polymer can react with a hydroxyl group or other group of the PEC polymer itself, another PEC polymer, or an optional crosslinker to form a covalent attachment. This may be accomplished, for example, (i) through liberation of a free isocyanate group or (ii) via displacement of the blocking group by a group of the PEC polymer itself or of another polymer or compound. Preferably, at least a substantial portion, and more preferably a majority, of the deblockable isocyanate groups are capable of deblocking during exposure to suitable film-curing conditions for a coating composition containing the PEC polymer. For example, a substantial portion (more preferably a majority) of the deblockable isocyanate groups preferably unblock when a planar metal substrate coated with a coating composition containing the PEC polymer is (a) heated in a 190° C. oven for about 20 minutes or (b) heated in a 250° C. oven for about 10 seconds. In one embodiment, preferred deblockable isocyanate groups do not appreciably unblock at room temperature, more preferably do not appreciably unblock at a temperature of less than about 50° C., and even more preferably do not appreciably unblock at a temperature of less than about 100° C.

Preferred self-crosslinking PEC polymers have an equivalents ratio of deblockable isocyanate groups to terminal hydroxyl groups of about 0.1:1 to about 10:1, more preferably about 0.2:1 to about 5:1, and even more preferably about 0.5:1 to about 2:1.

In another embodiment, the PEC polymer includes one or more oxirane groups, and more preferably a plurality of pendant oxirane groups. In one such embodiment, one or more pendant oxirane groups are provided in the form of non-deblockable isocyanate groups. Such non-deblockable groups can be produced, for example, by reacting an isocyanate group with a blocking agent such as glycidol. While not intending to be bound by any theory, the one or more oxirane groups are believed to help stabilize thermoplastic materials such as PVC and scavenge degradation products (e.g., HCl) resulting from degradation of the thermoplastic materials.

The molecular weight of the PEC polymer can vary depending upon material choice and the desired end use. In preferred embodiments, the PEC polymer has a number average molecular weight (Mn) of at least about 1,000, more preferably at least about 1,500, and even more preferably at least about 3,000. Preferably, the Mn of the PEC polymer is less than about 20,000, more preferably less than about 15,000, and even more preferably less than about 10,000.

The PEC polymer is preferably a reaction product of components including a polyester oligomer or polymer, more preferably a hydroxyl-functional polyester oligomer or polymer, and even more preferably a hydroxyl-terminated polyester oligomer or polymer. Preferred hydroxyl-functional polyester oligomers or polymers have a hydroxyl number of about 15 to about 200, more preferably about 25 to about 150, and even more preferably about 35 to about 115.

In a presently preferred embodiment, the PEC polymer is a reaction product of a partially blocked polyisocyanate and a hydroxyl-terminated polyester oligomer or polymer. The equivalents ratio of free isocyanate groups in the partially blocked polyisocyanate to hydroxyl groups in the hydroxyl-terminated polyester oligomer or polymer is preferably less than 1:1, more preferably about 0.25:1 to about 0.9:1, and even more preferably about 0.5:1 to about 0.8:1.

The molecular weight of the polyester oligomer or polymer may vary widely depending upon, for example, the desired molecular weight of the PEC polymer and/or the number of polyisocyanate molecules to be incorporated into the PEC polymer. For example, to prepare a PEC polymer having a desired molecular weight, two molecules of a polyester oligomer or polymer having a molecular weight of "X" could be used or, alternatively, four molecules of a polyester oligomer or polymer having a molecular weight of one-half X could be used. In certain preferred embodiments, the polyester oligomer or polymer has an Mn of preferably about 500 to about 10,000, more preferably about 750 to about 7,000, and even more preferably about 1,000 to about 5,000.

Examples of suitable polycarboxylic acids for use in forming polyester portions of the PEC polymer, or precursors thereof, include dicarboxylic acids and polyacids having higher acid functionality (e.g., tricarboxylic acids, tetracarboxylic acids, etc.), precursors or derivatives thereof (e.g., an esterifiable derivative of a polycarboxylic acid, such as a dimethyl ester or anhydride), or mixtures thereof. Diacids are presently preferred. Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, tetrahydrophthalic acid, isophthalic acid, trimellitic acid, terephthalic acid, naphthalene dicarboxylic acid, cyclohexane-dicarboxylic acid, glutaric acid, dimer fatty acids, anhydrides or derivatives thereof, and mixtures thereof. If desired, adducts of polyacid compounds (e.g., triacids, tetraacids, etc.) and monofunctional compounds may be used. An example of one such adduct is pyromellitic anhydride pre-reacted with benzyl alcohol.

Examples of suitable polyols for use in forming polyester portions of the PEC polymer, or precursors thereof, include diols, polyols having 3 or more hydroxyl groups (e.g., triols, tetraols, etc.), and combinations thereof. Diols are presently preferred. Suitable polyols may include, for example, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), and mixtures thereof. If desired, adducts of polyol compounds (e.g., triols, tetraols, etc.) and monofunctional compounds may be used. An example of one such adduct is dipentaerythritol pre-reacted with benzoic acid.

As discussed above, the PEC polymer is preferably a reaction product of ingredients including one or more polyisocyanates. Any suitable polyisocyanate may be employed including, compounds having 2 or more, 3 or more, or 4 or more free and/or blocked isocyanate groups. In one embodiment, the polyisocyanate compound is a trifunctional "trimer" that is a trimerization product prepared from on average three diisocyanate molecules. In another embodiment, the polyisocyanate compound is a trimer prepared from on average three moles of diisocyanate (e.g., HMDI) reacted with one mole of another compound such as, for example, a triol (e.g., trimethylolpropane). Suitable diisocyanates for use alone, or in forming a trimer, may include isophorone diisocyanate (i.e., 5-isocyanato-1-isocyanatomethyl-1,3,3-trimethylcyclohexane); 5-isocyanato-1-(2-isocyanatoeth-1-yl)-1,3,3-trimethylcyclohexane; 5-isocyanato-1-(3-isocyanatoprop-1-yl)-1,3,3-trimethylcyclohexane; 5-isocyanato-(4-isocyanatobut-1-yl)-1,3,3-trimethylcyclohexane; 1-isocyanato-2-(3-isocyanatoprop-1-yl)cyclohexane; 1-isocyanato-2-(3-isocyanatoeth-1-yl)cyclohexane; 1-isocyanato-2-(4-isocyanatobut-1-yl)cyclohexane; 1,2-diisocyanatocyclobutane; 1,3-diisocyanatocyclobutane; 1,2-diisocyanatocyclopentane; 1,3-diisocyanatocyclopentane; 1,2-diisocyanatocyclohexane; 1,3-diisocyanatocyclohexane; 1,4-diisocyanatocyclohexane; dicyclohexylmethane 2,4'-diisocyanate; trimethylene diisocyanate; tetramethylene diisocyanate; pentamethylene diisocyanate; hexamethylene diisocyanate; ethylethylene diisocyanate; trimethylhexane diisocyanate; heptamethylene diisocyanate; 2-heptyl-3,4-bis(9-isocyanatononyl)-1-pentyl-cyclohexane; 1,2-, 1,4-, and 1,3-bis(isocyanatomethyl)cyclohexane; 1,2-, 1,4-, and 1,3-bis(2-isocyanatoeth-1-yl)cyclohexane; 1,3-bis(3-isocyanatoprop-1-yl)cyclohexane; 1,2-, 1,4- and 1,3-bis(4-isocyanatobuty-1-yl)cyclohexane; liquid bis(4-isocyanatocyclohexyl)-methane; and derivatives or mixtures thereof. Aliphatic isocyanates are presently preferred, with isophorone diisocyanate ("IPDI") and hexamethylene diisocyanate ("HMDI") being particularly preferred.

Preferably, the polyisocyanate is a partially blocked polyisocyanate. Preferred partially blocked polyisocyanates contain, on average, at least about 1.5, more preferably at least about 1.8, and even more preferably at least about 2 free (or unblocked) isocyanate groups per molecule of partially blocked polyisocyanate. The partially blocked polyisocyanate preferably contains on average less than about 3, more preferably less than about 2.5, and even more preferably less than about 2.2 free (or unblocked) isocyanate groups per molecule of partially blocked polyisocyanate.

Partially blocked isocyanate trimers are preferred polyisocyanate compounds for producing the PEC polymer of the invention. While not intending to be bound by any theory, the use of a partially blocked isocyanate trimer may provide one or more of the following benefits: (i) enhanced safety for personnel handling the isocyanate trimer as compared to diisocyanates, (ii) incorporation of additional crosslinking sites in the PEC polymer, (iii) avoidance of gelling during production of the PEC polymer, and/or (iv) manufacturing cost savings due to reduced processing time in obtaining a polyester polymer having a suitably high molecular weight.

Preferred partially blocked polyisocyanates contain, on average, at least about 0.5, more preferably at least about 0.7, and even more preferably at least about 1 blocked isocyanate groups per molecule of partially blocked polyisocyanate. The blocked isocyanate groups of the at least partially blocked polyisocyanate can be any suitable combination of deblockable and/or non-deblockable isocyanate groups. In some embodiments, all or substantially all of the blocked isocyanate groups are deblockable, whereas in other embodiments, all or substantially all of the isocyanate groups are non-deblockable.

In a presently preferred embodiment, the partially blocked polyisocyanate is a trimer compound having two free isocyanate groups and one blocked isocyanate group.

Examples of suitable agents for blocking isocyanate groups include phenols, such as phenol, cresol, xylenol, ethylphenol, t-butylphenol, hydroxybenzoic acid and esters of this acid, or 2,5-di-tert-butyl-4-hydroxytoluene; lactams, such as ε-caprolactam, δ-valerolactam, γ-butyrolactam or β-propiolactam; active methylenic compounds, such as diethyl malonate, dimethyl malonate, ethyl or methyl acetoacetate, or acetylacetone; alcohols, such as ethanol, n-propanol, isopropanol, n-butanol, isobutanol, t-butanol, n-amyl alcohol, t-amyl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, or diacetone alcohol; amides, such as acetoanilide, acetoanisidinamide, acrylamide, methacrylamide, acetamide, stearamide or benzamide; imides, such as succinimide, phthalimide or maleimide; amines, such as diphenylamine, phenylnaphthylamine, xylidine, N-phenylxylidine, carbazole, aniline, naphthylamine, butylamine, dibutylamine or butylphenylamine; imidazoles, such as imidazole or 2-ethylimidazole; ureas, such as urea, thiourea, ethyleneurea, ethylenethiourea or 1,3-diphenylurea; carbamates, such as phenyl N-phenylcarbamate or 2-oxazolidone; imines, such as ethyleneimine; oximes, such as acetone oxime, formaldoxime, acetaldoxime, acetoxime, methyl ethyl ketoxime, diisobutyl ketoxime, diacetyl monoxime, benzophenone oxime or chlorohexanone oximes; salts of sulfurous acid, such as sodium bisulfite or potassium bisulfite; hydroxamic esters, such as benzyl methacrylohydroxamate (BMH) or allyl methacrylohydroxamate; substituted pyrazoles and triazoles; oxirane-containing compounds such as glycidol; other compounds containing one or more groups that are reactive with isocyanate groups and one or more non- or less-reactive groups with isocyanate groups (e.g., acrylamide, amino alcools, acids alcool, amino acids, etc.); or mixtures thereof. Presently preferred blocking agents include glycidol, ε-caprolactam, methyl ethyl ketoxime (MEKO), diisopropylamine (DIPA), and mixtures thereof.

Presently preferred blocking agents for forming deblockable isocyanate groups include ε-caprolactam, DIPA, MEKO, and mixtures thereof. Presently preferred blocking agents for forming non-deblockable isocyanate groups include glycidol, hydroxyethyl acrylate, and mixtures thereof.

The PEC polymer may be formed using any suitable amount of one or more polyester oligomers or polymers and one or more partially blocked polyisocyanate compounds. In certain preferred embodiments, the PEC polymer includes one or more polyester oligomers or polymers in an amount from about 10 to about 99 weight percent ("wt-%"), more preferably from about 25 to about 95 wt-%, and even more preferably from about 50 to about 90 wt-%, based on the total non-volatile weight of the reactants used to form the PEC polymer. In certain preferred embodiments, the PEC polymer includes one or more polyisocyanates (more preferably one or more partially blocked polyisocyanates and even more preferably one or more partially-blocked polyisocyanate trimers) in an amount from about 1 to about 90 wt-%, more preferably from about 5 to about 75 wt-%, and even more preferably from about 10 to about 50 wt-%, based on the total non-volatile weight of the reactants used to form the PEC polymer.

The invention further provides coating compositions suitable for coating a variety of substrates including, for example, the interior or exterior surfaces of food or beverage packaging articles. The coating composition of the invention is particularly useful as one or more layers of a mono-coat or multi-coat food-contact coating applied to at least a portion of a metal substrate of a food or beverage packing container.

Certain coating compositions of the invention, including cured and uncured coating compositions, are preferably substantially free, more preferably essentially free, even more preferably essentially completely free, and optimally completely free of at least one of, and more preferably both of:

(A) mobile bisphenol A (BPA) and aromatic glycidyl ether compounds (e.g., diglycidyl ethers of bisphenol A (BADGE), diglycidyl ethers of bisphenol F (BFDGE), and epoxy novalacs); or (B) bound BPA and aromatic glycidyl ether compounds (e.g., BADGE, BFDGE and epoxy novalacs).

In addition, in some embodiments, coating compositions of the invention are free (i.e., do not contain any measurable amounts) or substantially free of one or more (i.e., two, three, or four) of the below compounds C-F. (The definition previously provided in the Selected Definitions section for the phrase "substantially free" does not apply in the context the following compounds C-F.)

(C) extractible formaldehyde-containing compounds (e.g., mobile formaldehyde-based crosslinkers);

(D) bound formaldehyde-containing compounds;

(E) oxirane-containing compounds (e.g., BADGE, BFDGE, epoxy novalacs, and epoxidized oils); or (F) certain tin-containing compounds such as tin mercaptans and tin carboxylates.

In a presently preferred embodiment, the invention provides a coating that, when suitably cured, contains less than about 200 parts per billion ("ppb"), more preferably less than about 100 ppb, even more preferably less than about 50 ppb, and optimally less than about 10 ppb of extractible isocyanate-containing compounds. An example of a test methodology useful for determining the amount of extractible isocyanate-containing compounds present in a coating is provided below in the Test Methods section.

Preferred PEC polymers are at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4' dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments. In some embodiments, the coating composition of the invention is epoxy-free, or at least substantially epoxy-free.

Coating compositions of the invention may include any suitable amount of PEC polymer to produce the desired result. In preferred embodiments, the coating compositions include at least about 15, more preferably at least about 20, and even more preferably at least about 25 wt-% of PEC polymer, based on the total non-volatile weight of the coating composition. Preferably, the coating compositions include less than about 65, more preferably less than about 60, and even more preferably less than about 55 wt-% of the PEC polymer, based on the total non-volatile weight of the coating compositions.

Preferred coating compositions of the invention include the PEC polymer in combination with a thermoplastic material. While not intending to be bound by any theory, it is believed that preferred embodiments of the PEC polymer are capable of stabilizing certain thermoplastic materials (e.g., PVC) to prevent or decrease degradation of the thermoplastic material or a cured coating resulting therefrom. In addition, it is also believed that preferred PEC polymers can function as a plasticizer in such compositions.

Such coating compositions preferably include at least about 10, more preferably at least about 15, and even more preferably at least about 20 wt-% of thermoplastic material, based on the total nonvolatile weight of the coating composition. The coating compositions preferably include less than about 80, more preferably less than about 70, and even more preferably less than about 65 wt-% of thermoplastic material, based on the total nonvolatile weight of the coating composition.

Examples of suitable thermoplastic materials include halogenated polyolefins, which include, for example, copolymers and homopolymers of vinyl chloride, vinylidenefluoride, polychloroprene, polychloroisoprene, polychlorobutylene, and combinations thereof. PVC is a particularly preferred thermoplastic material. The thermoplastic material preferably has a number average molecular weight (Mn) of from about 40,000 to about 300,000; more preferably from about 75,000 to about 200,000; and even more preferably from about 100,000 to about 150,000.

In applications involving packaging coatings, dispersion grade thermoplastic particles are preferred, where the particles range in size from greater than 0 to about 5 microns, based on volume-average median particle diameter. Other sizes, however, can be used such as, for example, non-dispersion grade thermoplastic particles that range in size from about 5 to about 100 microns, based on volume-average median particle diameter.

The thermoplastic material is preferably dispersed in a liquid carrier to form a thermoplastic dispersion. Examples of suitable liquid carriers include an organic solvent, a plasticizer, or mixtures thereof. Suitable organic solvents may include polar solvents such as ketones (e.g., MIBK and DIBK), glycol ethers, alcohols, aliphatic hydrocarbons, aromatic hydrocarbons, or mixtures thereof. In some embodiments, it may be advantageous to choose a solvent that has an affinity to the thermoplastic material and/or one that can swell the thermoplastic particles to facilitate storage stability of the liquid coating composition. Preferred liquid carriers exhibit sufficient volatility to substantially evaporate from the coating composition during the curing process. The liquid carrier is preferably substantially non-aqueous (e.g., includes 5 wt-% or less of water, or 2 wt-% or less of water, if any).

Preferred coating compositions include at least about 35, more preferably at least about 40, and even more preferably at least about 45 wt-% of solids, based on the total weight of the coating composition. Preferably, the coating compositions include less than about 80, more preferably less than about 70, and even more preferably less than about 65 wt-% of solids, based on the total weight of the coating composition.

In some embodiments, coating compositions of the invention are organosols or plastisols. Organosols useful in the compositions of the invention, include, for example, vinyl organosols. A "vinyl organosol," as used herein, is a dispersion of vinyl chloride polymers (preferably high-molecular-weight vinyl chloride polymers) in a liquid carrier.

In some embodiments, coating compositions of the invention may be formulated using one or more curing agents, including, for example, one or more crosslinkers. The choice of a particular crosslinker typically depends on the particular product being formulated. For example, some coating compositions are highly colored (e.g., gold-colored coatings). These coatings may typically be formulated using crosslinkers that tend to have a yellowish color. In contrast, white coatings are generally formulated using non-yellowing crosslinkers, or only a small amount of a yellowing crosslinker.

For coating compositions of the invention that employ a self-crosslinking embodiment of the PEC polymer, it may not be necessary or desirable to include a separate curing agent such as a crosslinker. For example, if a crosslinked coating is desired that is at least substantially free of bound and/or mobile formaldehyde-containing compounds, it may be advantageous to achieve suitable crosslinking through use of a self-crosslinkable PEC polymer alone and/or through use of a suitable amount of crosslinker that does not contain formaldehyde. In certain embodiments, suitable crosslinking may be achieved using the PEC polymer alone without the assistance of any external crosslinkers. Similarly, if an isocyanate crosslinked coating is desired, incorporation of deblockable isocyanate groups into a self-crosslinking PEC polymer of the invention may provide a cured coating that exhibits reduced migration (or substantially no migration) of mobile isocyanate compounds due to the isocyanate compounds being bound to the PEC polymer.

When present, the concentration of one or more optional crosslinkers may vary depending upon the desired result. For example, in some embodiments, the coating compositions may contain from about 0.01 wt-% to about 30 wt-%, more preferably from about 0.5 wt-% to about 25 wt-%, or even more preferably from about 3 wt-% to about 20 wt-% of one or more crosslinkers, by weight of nonvolatile material in the coating composition.

Any suitable crosslinker can be used. For example, phenolic crosslinkers (e.g., phenoplasts), amino crosslinkers (e.g., aminoplasts), and combinations thereof, may be used.

Examples of suitable phenolic crosslinkers (e.g., phenoplasts) include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, BPA (not presently preferred), and combinations thereof. Examples of suitable commercially available phenolic compounds include the BAKELITE 6535LB, 6581 LB, and 6812LB (each available from Hexion Specialty Chemicals GmbH), DUREZ 33162 (Durez Corporation, Addison, Tex.), PHENODUR PR 285 55/IBB and PR 897 (each available from CYTEC Surface Specialties, Smyrna, Ga.), and SANTOLINK EP 560 products.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1131, CYMEL 1125, and CYMEL 5010 (all available from Cytec Industries Inc., West Patterson, N.J.); the MAPRENAL MF 980 product (Cytec Industries Inc.); and Uramex BF 892 (available from DSM, Netherlands).

The coating composition may also include a catalyst to increase the rate of cure. If used, a catalyst is preferably present in an amount of from about 0.05 wt-% to about 1 wt-%, and more preferably from about 0.1 wt-% to about 0.5 wt-% of nonvolatile material. Examples of catalysts suitable for use in curing the one or more optional crosslinkers may include acid catalysts such as phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), alkyl acid phosphate (AAP) and the like, and mixtures thereof. Examples of catalysts suitable for use in curing self-crosslinker PEC polymers of the invention include tertiary amines, certain metallic compounds (e.g., tin, bismuth, etc.), or mixtures thereof.

If desired, coating compositions of the invention may optionally include other additives that do not adversely affect the coating composition or a cured coating resulting therefrom. The optional additives are preferably at least substantially free of mobile and/or bound BPA and aromatic glycidyl ether compounds (e.g., BADGE, BFDGE and epoxy novalac compounds). Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents, or combinations thereof. Each optional ingredient can be included in a sufficient amount to serve its intended purpose, but preferably not in such an amount to adversely affect a coating composition or a cured coating resulting therefrom.

Plasticizers can also be incorporated in the thermoplastic dispersion. Additional organic solvents can be added as diluents (e.g., aromatic solvents) to alter the application characteristics and adjust viscosity and fluidity for ease of processing and application.

Thermoplastic dispersions can be prepared using any suitable method to provide sufficient suspension and dispersion of particles included therein. Examples of suitable process methods include solution blending, high-speed dispersion, high-speed milling, and the like. A substantially homogeneous dispersion of the particles throughout the liquid carrier typically indicates an adequate mixture or blend. The thermoplastic particles preferably remain substantially undissolved in the liquid carrier.

To prepare certain organosol coating compositions of the invention, a thermoplastic dispersion is generally made in a first step (a dispersion phase) where the composition is thickened and has somewhat higher solids than the subsequent phase, often referred to as the "let down," where additional components (e.g., the PEC polymer) are stirred in at a slower rate. Examples of suitable process methods include admixture, blending, paddle stirring, etc.

Cured coatings of the invention preferably adhere well to metal (e.g., steel, tin-free steel (TFS), tinplate, electrolytic tin plate (ETP), aluminum, etc.) and provide high levels of resistance to corrosion or degradation that may be caused by prolonged exposure to, for example, food or beverage products. The coatings may be applied to any suitable surface, including inside surfaces of containers, outside surfaces of containers, container ends, and combinations thereof.

Cured coatings of the invention are particularly well suited as adherent coatings for metal cans or containers, although many other types of articles can be coated. Examples of such articles include closures (including, e.g., internal surfaces of twist off caps for food and beverage containers); internal crowns; two and three-piece cans (including, e.g., food and beverage containers); shallow drawn cans; deep drawn cans (including, e.g., multi-stage draw and redraw food cans); can ends (including, e.g., easy open can ends); monobloc aerosol containers; and general industrial containers, cans, and can ends.

Preferred coating compositions of the invention are particularly suited for use in forming food-contact coatings. Preferably, the cured coatings are retortable when employed in food and beverage container applications. Preferred cured coatings are capable of withstanding elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Examples of such aggressive food or beverage products may include meat-based products, milk-based products, fruit-based products, energy drinks, and acidic or acidified products.

Coating compositions of the invention can be applied in a single coat, or monocoat, system or can constitute one or more layers of a multi-coat system. The coating compositions can be applied, for example, either directly to a surface of a substrate or to one or more intermediate coats (e.g., size coats) applied to the substrate. Examples of suitable size coats may include epoxy-phenolic size coats, polyester size coats (including, e.g., polyester-phenolic size coats, polyester-carbamate based size coats (with or without external crosslinkers), etc.), and combinations thereof. An example of a suitable epoxy-phenolic size coat is a composition that includes from about 60 to about 90 wt-% of epoxy resin and from about 10 to about 40 wt-% of phenolic resin, by weight of nonvolatiles in the coating composition. A specific example of a suitable polyester-phenolic size coat is a composition that includes about 60 to 80% by weight of nonvolatiles of one or more polyesters and about 20 to 40% by weight of nonvolatiles of one or more phenolic resins. The polyester size coat can optionally include crosslinkers such as, for example, aminoplast resins or blocked isocyanates.

Furthermore, the one or more polyester polymers of the polyester size coat may optionally include polymer linkages (e.g., amide, carbonate ester, ether, urea, urethane, etc.), side chains, and end groups not related to simple polyol and polyacid components. In an embodiment, the size coat of a multi-layer coating system of the present invention includes a polyester polymer in the form of a polyester-carbamate polymer, which may optionally include one or more pendant or terminal blocked isocyanate groups. Suitable polyester-carbamate polymers having blocked isocyanate groups include, for example, those described herein. Additional suitable polyester-carbamate polymers and suitable size coat compositions formulated therefrom are described in International Application No. WO 2010/062928 filed on Nov. 25, 2009 and entitled "Polyester Polymer and Coating Compositions Thereof" Polyester-carbamate polymers having blocked isocyanate groups may be formed, for example, via reaction of ingredients including a partially blocked polyisocyanate compound, more preferably a partially blocked isocyanate trimer. In an embodiment, the size coat includes, based on total nonvolatile weight, from about 15 to about 70 wt-% of polyester-carbamate polymer (which preferably includes one or more pendant blocked isocyanate groups) and 0.5 to 30 wt-% of one or more crosslinkers (which preferably includes at least some phenolic crosslinker, and more preferably at least some resole phenolic crosslinker) and is preferably substantially free of BPA and BADGE and/or aromatic glycidyl ether compounds other than BADGE.

In some embodiments, the coating composition may be applied as a topcoat (including, e.g., as a food-contact topcoat) over one or more size coats applied on, for example, an interior or exterior surface of an easy open can end. In other embodiments, the coating composition of the invention may be applied as a monocoat directly to, for example, a surface of a three-piece or shallow drawn food can, bottle crown, or monobloc aerosol container.

The coating composition can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment, where the coating is used to coat metal sheets or coils, the coating can be applied by roll coating.

The coating composition can be applied on a substrate prior to, or after, forming the substrate into an article. In some embodiments, at least a portion of the substrate is coated with a layer of the coating composition of the invention, which is then cured before the substrate is formed into an article.

After applying the coating composition onto a substrate, the composition can be cured using a variety of processes, including, for example, oven baking by either conventional or convectional methods, or any other method that provides an elevated temperature that preferably allows the thermoplastic material particles to fuse together. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the invention can be dried and cured in one step.

The curing process may be performed at any suitable temperature, including, for example, oven temperatures in the range of about 177° C. to about 232° C. The upper end of suitable curing temperature, however, can change depending on the decomposition temperature of the thermoplastic material employed in a particular embodiment. PVC, for example, typically begins to degrade at about 188° C., while other materials may degrade at higher or lower temperatures. If PVC is employed and the substrate to be coated is a metal sheet, curing of the applied coating composition may be performed, for example, by subjecting the coated metal to an oven temperature of about 177° C. to about 205° C. for about 5 to 15 minutes. If metal coil is the substrate to be coated, curing of the applied coating composition may be conducted, for example, by subjecting the coated metal to an oven temperature of about 210° C. to about 232° C. for about 15 to 30 seconds.

For self-crosslinking embodiments of the PEC polymer that employ deblockable isocyanate groups, the curing conditions are preferably suitable to achieve a desired amount of deblocking and crosslinking.

Test Methods

Unless indicated otherwise, the following test methods were utilized in the Examples that follow.

A. Retort Method

This test provides an indication of an ability of a coating to withstand conditions frequently associated with food or beverage preservation or sterilization. For the present evaluation, coated substrate samples (in the form of electrolytic tin plate (ETP) flat panels) were placed in a vessel and partially immersed in a test substance. While totally immersed in the test substance, the coated substrate samples were placed in an autoclave and subjected to heat of 130° C. and pressure of 1 atm above atmospheric pressure for a time period of 60 minutes. Just after retort, the coated substrate samples were tested for adhesion, blush resistance, and/or stain resistance.

B. Adhesion Test

Adhesion testing was performed to assess whether the coating compositions adhere to the coated substrate. The Adhesion Test was performed according to ASTM D 3359-Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

The results of this test for coatings prepared according to the present invention (after retort pursuant to the Retort Method) are presented in Table 5.

C. Blush Resistance Test

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush, a rating of "8" indicates slight whitening of the film, and a rating of "5" indicates whitening of the film, and so on. Blush ratings of 7 or more are typically desired for commercial packaging coatings and optimally 9 or above. The results of this test for coatings prepared according to the present invention are presented in Table 5.

D. Solvent Resistance Test

The extent of "cure" or crosslinking of a coating is measured as a resistance to solvents, such as methyl ethyl ketone (MEK) or isopropyl alcohol (IPA). This test is performed as described in ASTM D 5402-93. The number of double-rubs (i.e., one back-and-forth motion) is reported. Preferably, the MEK solvent resistance is at least 30 double rubs. The results of this test for coatings prepared according to the present invention are presented in Table 5.

E. Wedge Bend Test

This test provides an indication of a level of flexibility of a coating and an extent of cure. For the present evaluation, test wedges were formed from coated rectangular metal test sheets (which measured 12 cm long by 5 cm wide). Test wedges were formed from the coated sheets by folding (i.e., bending) the sheets around a mandrel. To accomplish this, the mandrel was positioned on the coated sheets so that it was oriented parallel to, and equidistant from, the 12 cm edges of the sheets. The resulting test wedges had a 6 mm wedge diameter and a length of 12 cm. To assess the wedge bend properties of the coatings, the test wedges were positioned lengthwise in a metal block of a wedge bend tester and a 2.4 kg weight was dropped onto the test wedges from a height of 60 cm.

The deformed test wedges were then immersed in a copper sulphate test solution (prepared by combining 20 parts of $CuSO_4.5H_2O$, 70 parts of deionized water, and 10 parts of hydrochloric acid (36%)) for about 2 minutes. The exposed metal was examined under a microscope and the millimeters of coating failure along the deformation axis of the test wedges were measured.

The results of this test for coatings prepared according to the present invention are presented in Table 5, with the data expressed as a wedge bend percentage using the following calculation:

$$100\% \times [(120\text{ mm}) - (\text{mm of failure})]/(120\text{ mm}).$$

A mono-coat coating system is considered herein to satisfy the Wedge Bend Test if it exhibits a wedge bend percentage of 70% or more, whereas a two-coat coating system is considered herein to satisfy the test if it exhibits a wedge bend percentage of 85% or more.

F. Four-Corner Box Draw Test

This test provides an indication of both the flexibility and adhesion of a cured coating on a substrate. Typically, a coated flat panel is stamped into a five-sided box (a bottom wall, four sidewalls, and an open top) using a press equipped with a specific tool which presents four angles with different radiuses of curvature. For the data in Table 5, a press model KE2130A from COFMO PRESSES (93297 Tremblay—France) was used. The tool enables the deformation of a 120×120 mm flat metal panel into a 50×60×17 mm box.

After formation of the box, each of the four corners of the box is visually inspected for tearing to assess the adherence of the coating. If no visual defects are observed for a particular corner, the corner is graded as a "pass." Preferably, two or more corners pass the 4-corner box draw test, and optimally three or more corners.

G. Quantification of Mobile Isocyanate Compounds

This test measures the amount of extractible isocyanate present in a cured polymer coating. Mobile isocyanate compounds are extracted from the cured coating with acetonitrile for 24 hours at room temperature. A derivatisating agent is added to stabilize the free isocyanate groups concurrently with their extraction. The methodology is described in the following paper: M. Driffield, E. L. Bradley and L. Castle, Journal of Chromatography A, 1141 (2007) 61-66.

H. Stain Resistance Test

Stain resistance is generally measured visually using a scale of 0-10, where a rating of "10" indicates no staining and a rating of "0" indicates a complete change of the color of the film. Samples of coated substrate were rated for stain resistance as follows:

10: no discoloration of the coating observed
8-9: very slight discoloration of the coating observed
7: some discoloration of the coating observed
6: appreciable discoloration of the coating observed
2-5: strong discoloration of the coating observed
0-1: very strong discoloration of the coating observed Stain resistance ratings of at least 6 are typically desired for commercially viable coatings and optimally 8 or above. A coating is considered herein to satisfy the Stain Resistance Test if it exhibits a stain rating of at least 6 when tested as described above. The results of this test for coatings prepared according to the present invention (after retort pursuant to the Retort Method) are presented in Table 5.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

Preparation of Hydroxyl-Terminated Polyesters A-C

Hydroxyl-terminated polyesters A, B, and C were produced as described below. The ingredients of each of polyesters A-C in the amounts indicated in Table 1 below were charged to a separate vessel equipped with a stirrer, reflux condenser, packed column, thermocouple, and a heating mantle. Each mixture was heated to a maximum of 250° C. During the reaction, water was extracted by distillation until an acid number of 10 to 20 was reached. Each polyester was then diluted with xylene to achieve a non-volatile content ("NVC") of about 93% by weight and subjected to azeotropic distillation until an acid number of 5 was reached. After this step, polyester C was then diluted with SOLVESSO 100 to reach an NVC of about 52% by weight.

TABLE 1

| Ingredient | Amount (weight %) | | |
|---|---|---|---|
| | Polyester A | Polyester B | Polyester C |
| Neopentylglycol | 18.64 | 20.73 | 23.85 |
| Ethylene glycol | 2.96 | 3.29 | 3.79 |
| 1,4-cyclohexanedimethanol | 10.54 | 11.72 | 13.48 |
| Sebacic acid | 37.28 | | |
| Adipic acid | | 32.30 | |
| Isophthalic acid | | | 29.44 |
| Terephthalic acid | | | 29.44 |
| RADIACID 960 dimer fatty acid | 30.58 | 28.96 | |
| Dibutyl tin dilaurate (DBTL) | 0.05 | | 0.05 |

Example 2

Preparation of Blocked Isocyanates A-C

Blocked isocyanate compounds A, B, and C were produced using the ingredient listed in Table 2 below. The "dried" solvents in Table 2 were mixed in advance with molecular sieves to avoid the presence of water.

Blocked isocyanate compound A was produced by first dissolving VESTANATE 1890/100 isocyanate tablets in dried xylene in a reactor at 80° C. After 2 hours of mixing, caprolactam was added in the reactor. Complete dissolution of the caprolactam was observed after a few minutes. The DBTL solution was then added to the mixture and the reactor was slowly heated to 100° C. Following the heating step, the % NCO (i.e., the weight of isocyanate groups divided by the weight of the mixture in the reactor) of the mixture was determined by titration and the reaction was stopped when the theoretical % NCO was reached (i.e., in this case, the theoretical point at which one-third of the isocyanate groups were calculated to be blocked and two-thirds were calculated to be unblocked), which took less than 2 hours.

Blocked isocyanate compound B was produced using the same methodology as described above except the resulting mixture having the desired % NCO was diluted with a second charge of xylene to obtain a mixture having an NVC of 60% by weight.

Blocked isocyanate compound C was produced as follows. DESMODUR 3390 isocyanate was heated at 50° C. in a reactor. After addition of the DBTL solution, glycidol was slowly added in the reactor over 45 minutes. After all of the glycidol had been added, the % NCO was determined by titration on mixture samples and the reaction was stopped when the theoretical % NCO was reached (same as above), which took less than 2 hours. The mixture was then diluted to 70% by weight NVC with dried xylene and dried SOLVESSO 100.

TABLE 2

| Ingredient | Amount (weight %) | | |
|---|---|---|---|
| | Blocked Isocyanate A | Blocked Isocyanate B | Blocked Isocyanate C |
| IPDI-based polyisocyanate* | 60.58 | 51.9 | |
| HDI trimer** | | | 68.98 |
| Caprolactam | 9.41 | 8.1 | |
| Glycidol | | | 7.92 |
| 10 wt-% dibutyl tin dilaurate in dried xylene | 0.35 | | 0.7 |
| Dried xylene | 29.65 | 15 | 9.90 |
| Dried xylene charge 2 | | 25 | |
| Dried SOLVESSO 100 | | | 12.5 |

*VESTANATE 1890/100 product available from DEGUSSA.
**DESMODUR 3390 trimer available from BAYER.

Example 3

Production of PEC Polymers

PEC polymers A-C were produced using the ingredient listed in Table 3 below.

Each of PEC polymers A-C were produced as follows. The respective polyester A-C was charged in a reactor and heated up to 70° C. Then, the respective blocked isocyanate mixture A-C was added to the reactor over 20 minutes using an addition funnel, which was washed with SOLVESSO 100 solvent after addition was complete. The reaction was continued until the reaction mixture exhibited a stable viscosity, which took about 4 to 6 hours. The mixture was then diluted with DOWANOL PMA solvent.

TABLE 3

| Ingredient | PEC Polymer | | |
|---|---|---|---|
| (in weight %) | A | B | C |
| Polyester A | 43.96 | | |
| Polyester B | | 51.2 | |
| Polyester C | | | 74.64 |
| Blocked Isocyanate A | 20.17 | | |
| Blocked Isocyanate B | | 18.9 | |
| Blocked Isocyanate C | | | 4.27 |
| SOLVESSO 100 solvent | 14.45 | 15.6 | 4.69 |
| DOWANOL PMA solvent | 21.42 | 14.3 | 16.40 |

Example 4

Coating Compositions

Coating compositions 4.1-4.6 were produced using the ingredients listed below in Table 4, which were mixed using high speed agitation.

TABLE 4

| Ingredient | Coating Composition | | | | | |
|---|---|---|---|---|---|---|
| (in weight parts) | 4.1 | 4.2 | 4.3 | 4.4 | 4.5 | 4.6 |
| PEC Polymer A | 31.4 | | | | | |
| PEC Polymer B | | 34 | | | | |
| PEC Polymer C | | | 38.3 | 38.3 | 38.3 | 38.3 |
| PVC powder* | 34.5 | 30 | | | | |
| PVC powder in dispersion** | | | 40 | 80 | 120 | |
| Butylglycol | 23.9 | | 11.35 | 11.35 | 11.35 | 11.35 |
| Butyl cellosolve | | 33 | | | | |
| Phenolic resin | 8 | | 6.7 | 6.7 | 6.7 | 6.7 |
| Acid catalyst | 0.2 | | 0.35 | 0.35 | 0.35 | 0.35 |
| Wax | 2 | 1 | | | | |
| 30% lanolin solution*** | | 2 | 0.15 | 0.15 | 0.15 | 0.15 |

*GEON 178 powder
**50% by weight of GEON 178 powder in dispersion in a 1 to 1 solution of SOLVESSO 100 solvent and ethylene diglycol.
***The lanolin solution was added for purposes of easier tooling in order to measure coating porosity.

Example 5

Assessment of Coating Performance

Coated test articles were produced from the coating compositions of Example 4 to assess the coating performance characteristics of the various coating compositions.

Coating composition 4.1 was applied as a monocoat system direct to a surface of ETP substrate and the coated substrate was cured 12 minutes in a 190° C. oven to yield a film with a film density of 10 grams/meter$^2$ (g/m$^2$).

Coating composition 4.2 was applied onto a surface of ETP substrate that had been precoated with a cured epoxy phenolic size coat. Coating composition 4.2 was applied onto the precoated substrate and cured 12 minutes in a 190° C. oven to form a cured multi-coat system, where the film layer of coating composition 4.2 had a film density of 10 g/m$^2$.

Coating compositions 4.3-4.6 were each applied as a monocoat system direct to a surface of ETP substrate and the coated substrate was cured for 12 minutes in a 190° C. oven to yield a film with a film density of 6-7 g/m$^2$.

The coating performance data of the cured coatings are indicated in Table 5 below.

TABLE 5

| | | | Retort Tests | | | | | | | Four-corner box | |
|---|---|---|---|---|---|---|---|---|---|---|---|
| | | | | 3% acetic | | | | 0.3% cysteine chloride monohydrate + 1% sodium carbonate | | | After |
| Cured Coating | MEK | Tap water | acid + 2% NaCl | 2% acetic acid | 2% NaCl | 1% lactic acid | | | | Before retort | retort in tap water |
| Composition | Rubs | WB* | | Blush | | | | Staining | Adhesion | | |
| 4.1 | | 90 | 10 | 10 | | | | | | 4 | ** |
| 4.2 | 30 | 98 | 10 | 10 | | | | 10 | 10 | 2 | 1 |
| 4.3 | 20 | 85 | 4 | 8 | 6 | 4 | 8 | 0 | 6 | 90 | |
| 4.4 | 20 | 82 | 6 | 8 | 8 | 6 | 8 | 0 | 6 | 90 | |

TABLE 5-continued

| Cured Coating Composition | MEK Rubs | Tap water WB* | Retort Tests | | | | | | | Four-corner box | |
|---|---|---|---|---|---|---|---|---|---|---|---|
| | | | 3% acetic acid + 2% NaCl | 2% acetic acid | 2% NaCl | 1% lactic acid | 0.3% cysteine chloride monohydrate + 1% sodium carbonate | | Before retort | After retort in tap water |
| | | | | Blush | | | | Staining | Adhesion | | |
| 4.5 | 20 | 0 | 6 | 8 | 8 | 6 | 8 | 0 | 6 | 90 | |
| 4.6 | 20 | 79 | 6 | 9 | 8 | 8 | 6 | 0 | 6 | 0 | |

\* Wedge bend results
\*\* Not tested.

Example 6

Multi-Coat Coating Systems

Organosol coating compositions 6.1 and 6.2 were prepared that each included PEC Polymer A of Example 3, with and without phenolic crosslinker. The ingredients for the coating compositions are provided below in Table 6.

TABLE 6

| Ingredient (in weight parts) | Coating Composition | |
|---|---|---|
| | 6.1 | 6.2 |
| PEC Polymer A | 34.12 | 32.38 |
| Butylglycol | 25.82 | 24.11 |
| PVC Powder | 37.95 | 35.94 |
| Wax | 1.05 | 0.94 |
| 20% Lanolin Solution | 1.06 | 0.99 |
| Phenolic Resin | | 4.36 |
| Acid Catalyst | | 0.34 |

Coating compositions 6.1 and 6.2 were evaluated in the context of multi-coat coating systems. A commercial epoxy phenolic coating composition was first applied to planar metal substrate and cured to form a size coat. The epoxy phenolic coating composition was applied to yield a dry film weight of 8 g/m² and cured in a 200° C. oven for 12 minutes. Coating compositions 6.1 and 6.2 were each applied to pre-coated substrate at a dry film weight of 10 g/m² and cured in a 195° C. oven for 12 minutes. Coated test articles were produced to assess the coating performance characteristics of the cured multi-coat systems.

The coating performance data of the cured coatings are indicated in Table 7 below. The coating performance test data was generated using the pertinent methods described in the Test Methods section.

TABLE 7

| Organosol Topcoat | | 6.1 | 6.2 |
|---|---|---|---|
| Retort Tests: (60 minutes, 130° C., on Food Flat Panels) | | | |
| Tap Water | Blush/adhesion/stain/microblister | 9/10/10/10 | 9/10/10/10 |
| NaCl 2% | Blush/adhesion/stain/microblister | 8/10/10/10 | 10/10/10/10 |
| Lactic acid 1% | Blush/adhesion/stain/microblister | 7/10/10/10 | 10/10/10/10 |
| NaCl/Acetic acid* | Blush/adhesion/stain/microblister | 8/10/10/10 | 9/10/10/10 |
| Cystine | Blush/adhesion/stain/microblister | 7/10/10/10 | 9/10/10/10 |

TABLE 7-continued

| Organosol Topcoat | | 6.1 | 6.2 |
|---|---|---|---|
| Retort Tests: (60 minutes, 130° C., on Food Can Ends (first stage)) | | | |
| Tap Water | Blush/stain/microblister | 9/10/10 | 9/10/10 |
| NaCl 2% | Blush/stain/microblister | 9/10/10 | 9/10/10 |
| Lactic acid 1% | Blush/stain/microblister/corrosion | 8/10/8/8 | 9/10/8/9 |
| NaCl/Acetic acid* | Blush/stain/microblister | 9/10/10 | 9/10/10 |
| Cystine | Blush/stain/microblister | 9/6/10 | 9/6/10 |
| Retort Tests: (60 minutes, 130° C., on Four-Corner Box) | | | |
| NaCl 2% | Four-Corner Box (interior) | 2 | 1 |
| Tap Water | Four-Corner Box (exterior) | 2 | 0 |

*This retort solution was prepared using 800 grams water, 20 grams NaCl and 40 grams acetic acid. The retort immersion step used in conjunction with this retort solution was 90 minutes at 121° C.

An additional multi-coat coating system of the present invention was prepared having: (i) an organosol topcoat generally similar to that of Example 6.2 formed from ingredients including: PVC powder, a polyester-carbamate polymer having deblockable isocyanate groups (prepared using a partially blocked isocyanate trimer such as that previously described herein), a combination of resole phenolic crosslinkers, catalyst, wax, lanolin solution, and a combination of organic solvents; and (ii) a solvent-based polyester-carbamate size coat free of both BPA and BADGE formed from ingredients including: a polyester-carbamate polymer having deblockable isocyanate groups (prepared using a partially blocked isocyanate trimer such as that previously described herein), a combination of crosslinkers including both amino and resole phenolic crosslinkers, catalyst, and a combination of organic solvents. A cured sample of the multi-layer coating system on planar metal substrate was prepared using processes similar to that described above in Example 6. Surprisingly, the resulting cured multi-layer coating composition exhibited comparable coating properties (e.g., food-pack resistance) to the multi-layer coating systems of Example 6 which included an epoxy phenolic size coat.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

The invention claimed is:
1. A coating composition comprising:
a polyester-carbamate polymer having a backbone that includes both ester and carbamate linkages; and a thermoplastic dispersion including a halogenated polyolefin material.

2. The coating composition of claim 1, wherein the polyester-carbamate polymer comprises a self-crosslinkable polymer.

3. The coating composition of claim 1, wherein the polyester-carbamate polymer has at least one pendant group that includes an oxirane group.

4. The coating composition of claim 1, wherein the thermoplastic dispersion includes a substantially non-aqueous liquid carrier and the halogenated polyolefin material comprises polyvinylchloride particles.

5. The coating composition of claim 1, wherein the coating composition is substantially free of bound BPA and aromatic glycidyl ether compounds.

6. The coating composition of claim 1, wherein the coating composition, when suitably cured, includes less than about 10 parts per billion of mobile isocyanate-containing compounds.

7. The coating composition of claim 1, wherein the polyester-carbamate polymer includes at least one blocked isocyanate group.

8. The coating composition of claim 7, wherein at least one of the blocked isocyanate groups is deblockable.

9. The coating composition of claim 7, wherein the blocked isocyanate group comprises a reaction product of an isocyanate group and one or more of glycidol, ε-caprolactam, methyl ethyl ketoxime (MEKO), or diisopropylamine (DIPA).

10. The coating composition of claim 7, wherein the polyester-carbamate polymer includes at least one terminal hydroxyl group.

11. The coating composition of claim 1, wherein the coating composition comprises at least about 15 weight percent of the polyester-carbamate polymer, by weight nonvolatile material in the coating composition.

12. The coating composition of claim 11, wherein the coating composition includes at least about 10 weight percent of thermoplastic particles comprising the halogenated polyolefin material, by weight nonvolatile material in the coating composition.

13. The coating composition of claim 11, wherein the coating composition further comprises one or more external crosslinkers.

14. A food or beverage container, or a portion thereof, having a food-contact coating that includes a layer formed from the coating composition of claim 1.

15. The food or beverage container, or a portion thereof, of claim 14, wherein the food-contact coating comprises a multi-layer coating that includes a size coat layer formed from a coating composition including at least 15%, by weight nonvolatile material, of a polyester-carbamate polymer.

16. A method comprising:
providing a polyester-carbamate polymer; and
preparing an organosol coating composition that includes the polyester-carbamate polymer.

17. The method of claim 16, wherein the polyester-carbamate polymer comprises a reaction product of a partially blocked polyisocyanate and a hydroxyl-functional polyester oligomer or polymer.

18. The method of claim 17, wherein the partially blocked polyisocyanate includes, on average, (i) at least about 0.5 blocked isocyanate groups and (ii) from about 1.5 to about 3 free isocyanate groups.

19. The method of claim 17, wherein the ratio of free isocyanate groups in the partially blocked polyisocyanate to hydroxyl groups in the hydroxyl-terminated polyester oligomer or polymer is less than 1.

20. A method comprising:
providing a coating composition that comprises:
a polyester-carbamate polymer, and
a thermoplastic dispersion including a halogenated polyolefin material; and
applying the coating composition on a surface of a metal substrate prior to forming the metal substrate into a food or beverage container, or a portion thereof.

* * * * *